April 2, 1940.  E. GAIRING  2,195,645
AUTOMATIC NONSTOP LONGITUDINAL AND LATERAL MULTIPLE-OPERATION TOOL
Filed May 18, 1938  4 Sheets-Sheet 1
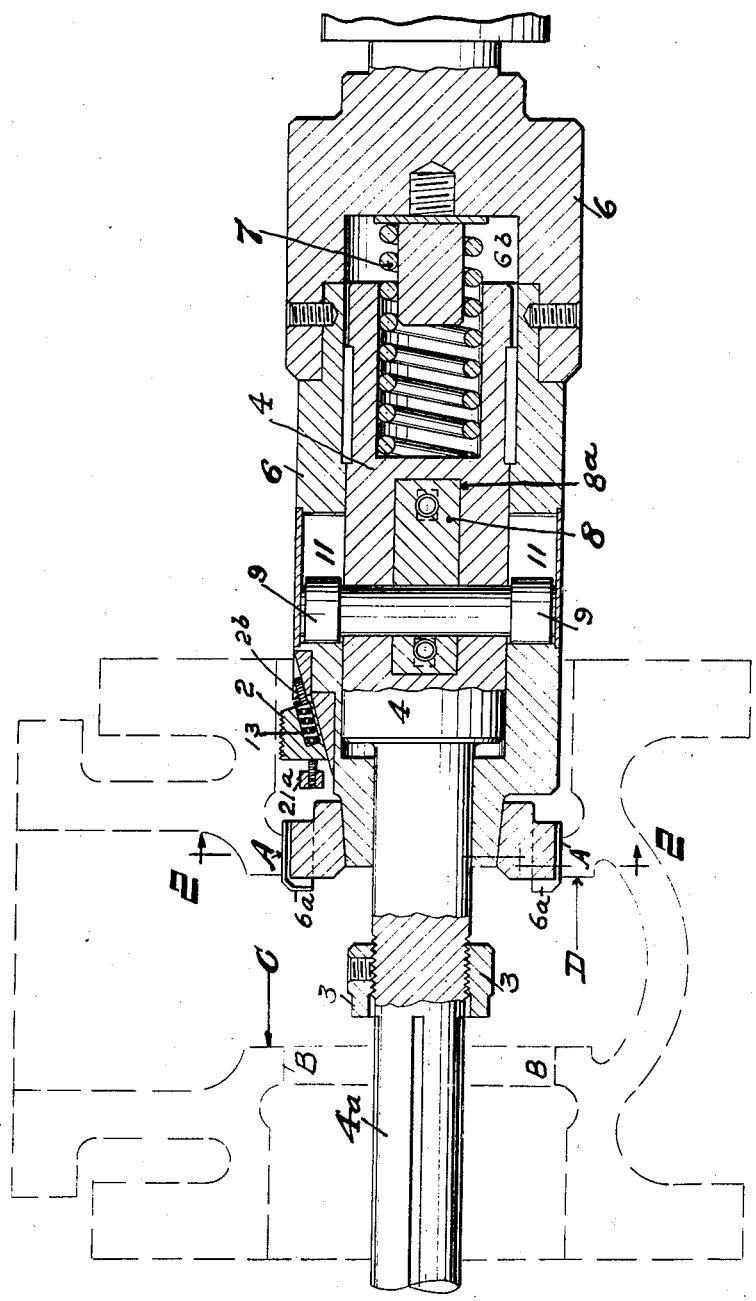
Fig. I
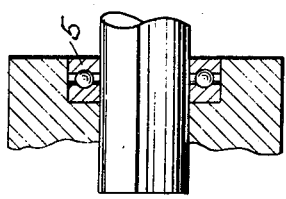

April 2, 1940.  E. GAIRING  2,195,645
AUTOMATIC NONSTOP LONGITUDINAL AND LATERAL MULTIPLE-OPERATION TOOL
Filed May 18, 1938  4 Sheets-Sheet 2
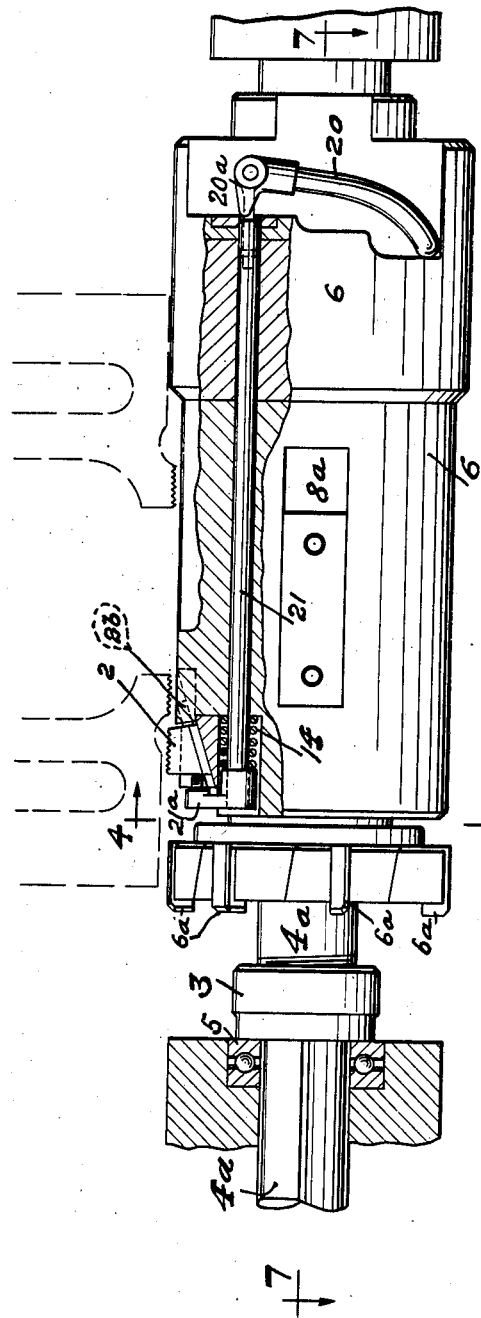
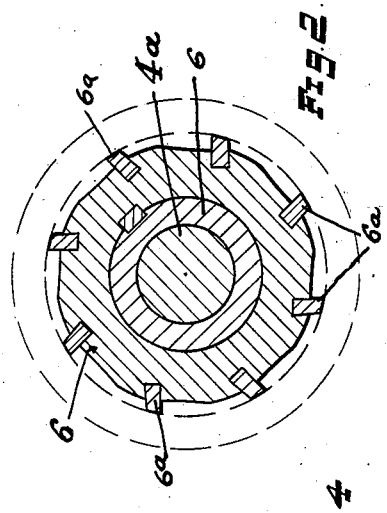
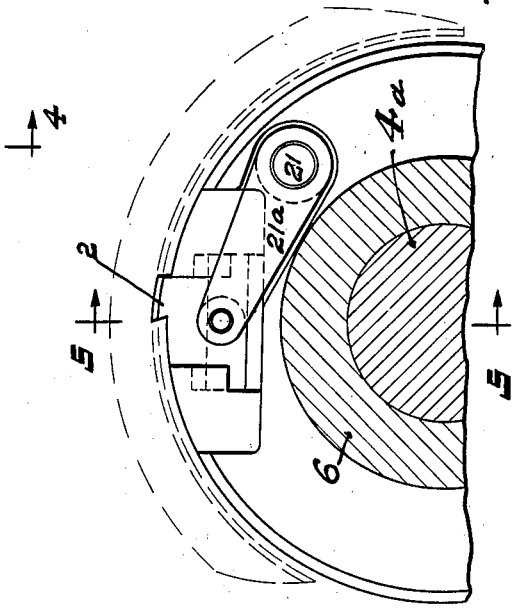
Emil Gairing INVENTOR
BY
J. L. Thomas ATTORNEY

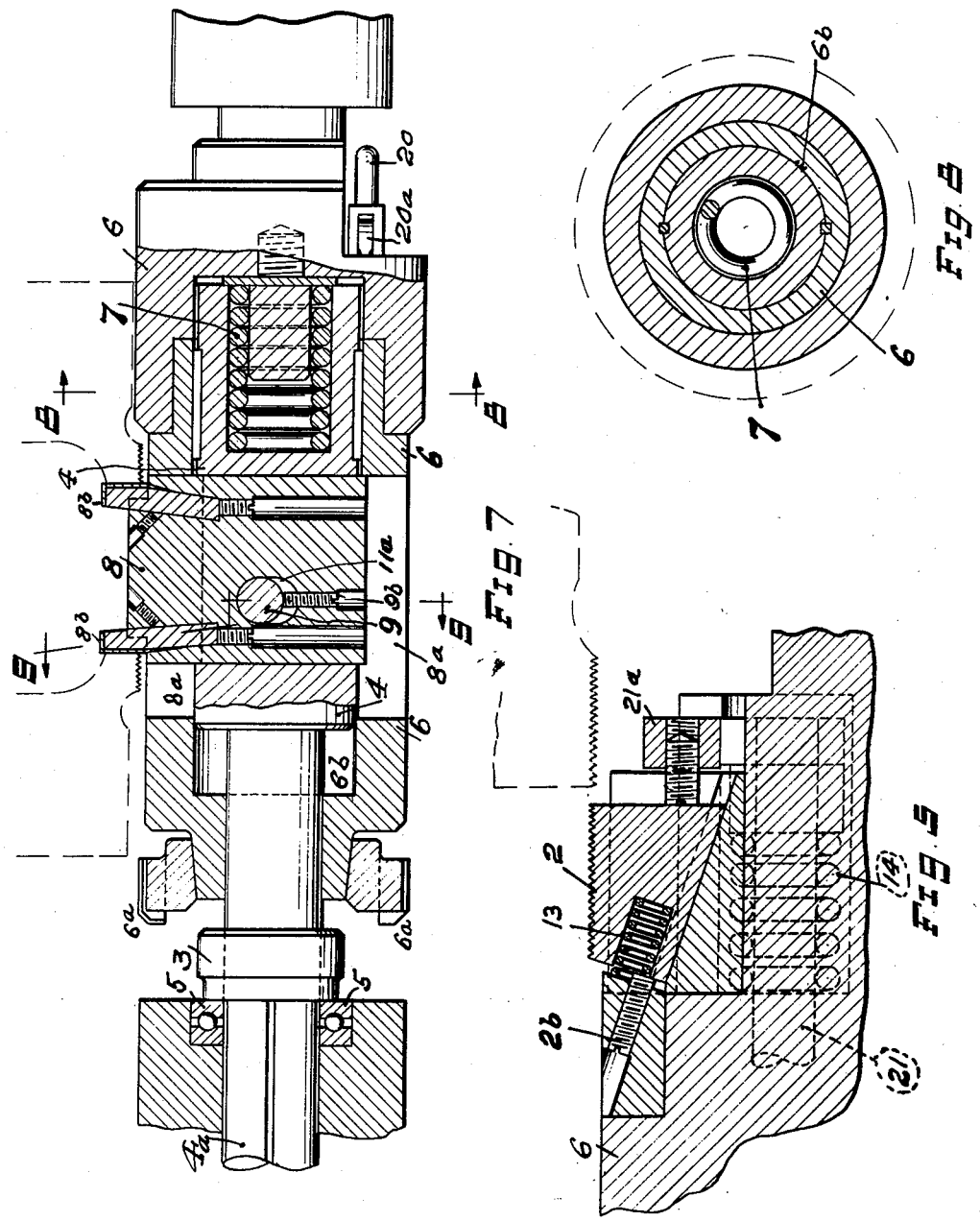

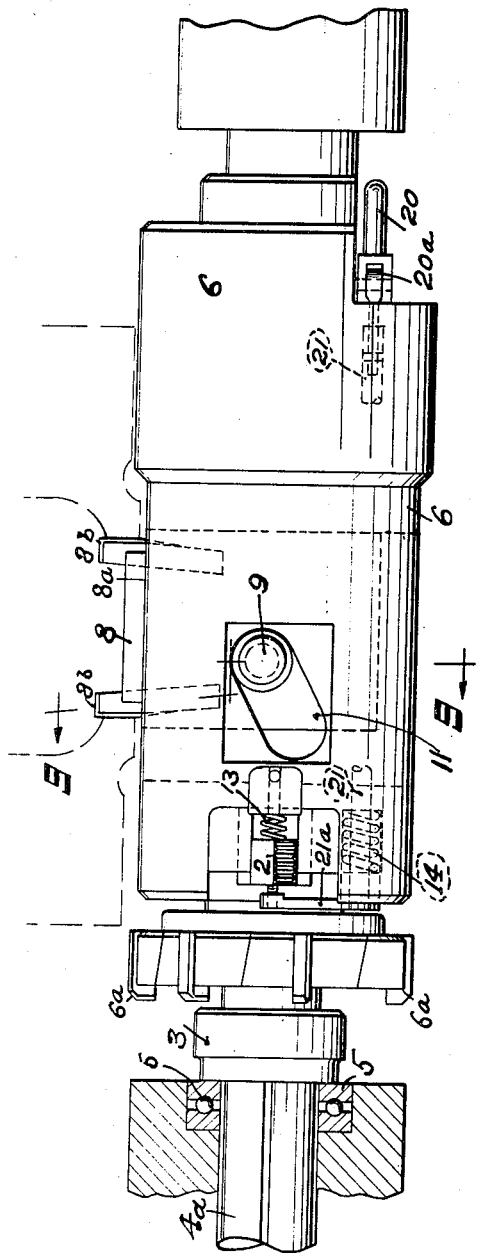
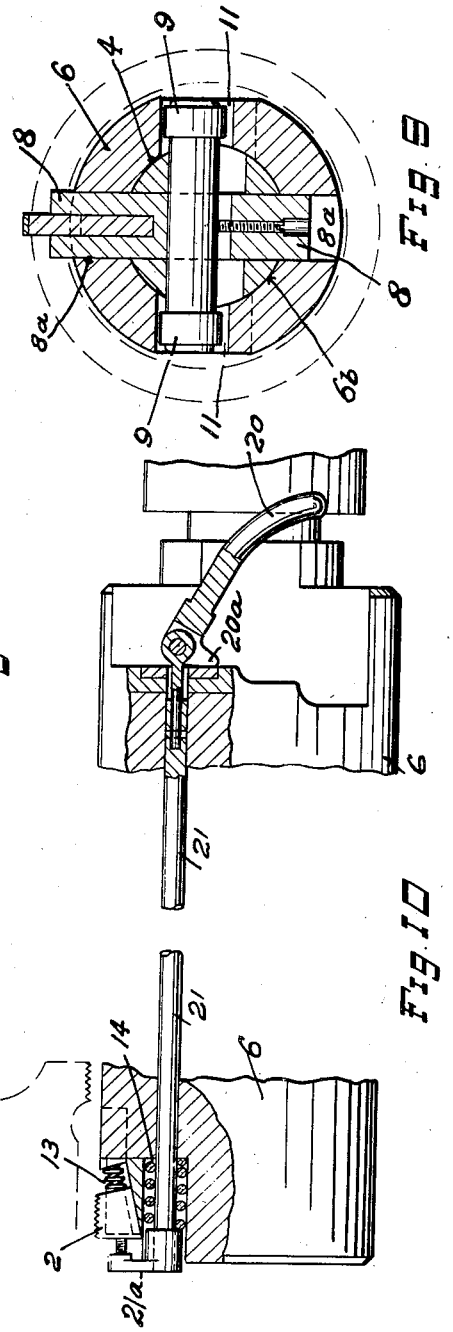

Patented Apr. 2, 1940

2,195,645

UNITED STATES PATENT OFFICE 2,195,645

AUTOMATIC NONSTOP LONGITUDINAL AND LATERAL MULTIPLE-OPERATION TOOL

Emil Gairing, Detroit, Mich., assignor to The Gairing Tool Company, Detroit, Mich., a corporation of Michigan Application May 18, 1938, Serial No. 208,626

5 Claims. (Cl. 10—145)

My invention relates to cutting tools and one of the objects of my invention is to provide an improved cutting tool by which longitudinal and lateral cutting may be done in one uninterrupted continuous operation.

I secure this object in the apparatus shown in the accompanying drawings in which:

Figure 1 is a view of a tool embodying my invention, and mainly in section through its axis, showing also in broken lines an outline of a gate valve to be finished by said tool.

Figure 2 is a cross-sectional view on line 2—2 Figure 1.

Figure 3 is a view of the tool, turned 90° about its axis and partly broken away, the parts being in a different relative position to Figure 1.

Figure 4 is a section taken on line 4—4 Figure 3.

Figure 5 is a detail sectional view, taken on or about line 5—5 of Figure 4 showing the chaser and cooperating parts on an enlarged scale.

Figure 6 is a view looking from above as shown in Figure 3.

Figure 7 is a section taken in a plane through the axis of the tool, as shown in Figure 6.

Figure 8 is a cross-sectional view on line 8—8 Figure 7.

Figure 9 is a cross-sectional view taken on line 9—9 Figure 7.

Figure 10 is a detail view largely broken away showing the chaser and operating parts in released position.

Referring to the accompanying drawings, 6 indicates an outer sleeve, having a coaxial bore 6b. Numeral 8a denotes a slot cut transversely through the walls of the sleeve 6, and axis thereof. Numeral 11 indicates a slot cut transversely through the wall of said sleeve at right angles to the slot 8a, and in a plane at an angle to the axis of said sleeve and the plane of the slot 8a.

Numeral 4 designates a pilot-bar fitting, adapted to slide in the bore of the sleeve 6, and having a spindle 4a, coaxial therewith, extending through an end of said sleeve. Numeral 3 denotes a stop-nut adapted to be adjusted to different positions on the spindle 4a, and fixed in the position to which it is adjusted. Numeral 7 denotes a compression spring, bearing at one end against the end wall of the sleeve 6, and at the other end against the pilot bar 4, opposite the end from which the spindle 4a projects. Numeral 8 denotes a tool-block fitting and adapted to slide in the slot 8a, transversely of the sleeve 6. Numeral 11 indicates an angular slot through the sleeve 6, and 11a, a slot in the pilot bar 4, transversely of the block 8. Numeral 9 denotes a pin passing through the slot 11a, and fixed in said block 8, by a set-screw 9b as shown in the drawings. The ends of the pin 9 engage in the slanting slot 11, and said slot, where it passes through the pilot-bar 4, is elongated to permit the relative motion of the pin 9. Numeral 8b denotes tool bits, in the end of the block 8. Numeral 6a, indicates cutting tools on the sleeve 6. Numeral 5 indicates a ring surrounding the spindle 4a, and fixed in a ball bearing to provide a thrust bearing for the stop-nut 3.

Numeral 2 denotes a chaser spaced from the cutters 6a and engaging at its lower edge upon a bearing surface on the sleeve 6, inclined longitudinally outward toward the rear. Numeral 13 denotes a spring adapted to urge said chaser forward and 2b denotes a set-screw for limiting the rearward and outward movement of said chaser. Numeral 21 indicates a rod, fitting and adapted to slide longitudinally in a bore in the sleeve 6, parallel to the axis of said sleeve. Numeral 21a indicates an arm extending at right angles from the end of the rod 21, to a position in front of the chaser 2, at which point it is provided with a set-screw for adjusting its point of engagement with said chaser face.

Numeral 14 is a spring urging the rod 21 forward so as to permit the chaser 2, under the impulse of its spring 13, to move to its forward and inner position. Numeral 20 denotes a lever arm pivoted to the rear end of the rod 21, and having a cam 20a at its pivoted end. When the lever arm 20 is in the position shown in Figure 10, the spring 14 forces the rod 21 forward withdrawing its arm 21a, from contact with the chaser 2. When said lever arm is turned to the position shown in Figure 3, the rod 21 is drawn rearward by the action of the cam 20a, and the chaser 2 is forced backward and outward.

The operation of the above described device is as follows:

The broken lines represent a gate valve and it is desired to finish and screw thread the circular surfaces A and B and to finish the surfaces C and D.

The tool is held without rotating in the turret machine and the work, in this case the gate valve, is rotated. The lever 20 is turned to the position shown in Figure 3, thus bringing the chaser 2 into place to cut the threads in the surfaces A and B. The turret presses the tool forward and the cutters 6a, first finish the surface A and pass beyond the same. The chaser 2 then engages, and cuts the screw-threads in said surface, and as the tool is further advanced, these operations are repeated on the surface B. The stop-nut 3, now engages the thrust bearing 5, and prevents the pilot-bar 4, from moving longitudinally any further. The sleeve 6, is however, forced along further so that the slanting sides of the slot 11 act upon the pin 9, to force the tool-block 8, laterally of the tool, so that the cutters 8b, engage and finish the surfaces C—D. During the latter part of the forward motion of the sleeve 6, the spring 7 is further compressed, thereby securely holding the bar 4, and stop nut 3, against ball bearing 5, while tool bits 8b, finish the surfaces D and C, and then retract. When this operation is accomplished the lever 20 is swung to the position shown in Figure 10, whereupon the chaser 2 returns to its forward and inward position. The sleeve 6 thereupon returns to its initial position (see Figure 1), and the pin 9 to its former location in the slot 11, causing block 8 to retract, whereupon the tension of the spring 7 is sufficiently released to permit the bar 4, to return as a unit with the sleeve 6, to the position indicated in Figure 1.

What I claim is:

1. In a cutting tool, the combination of a sleeve; a pilot-bar adapted to fit into said sleeve and slide longitudinally thereof; a spring interposed between the end of said pilot-bar and said sleeve acting to oppose relative longitudinal motion of said bar and sleeve; a tool-block adapted to fit and slide laterally in a transverse slot in said pilot-bar, said sleeve being slotted, and said block extending through said slot, said slot in said sleeve being sufficient to permit said block to move longitudinally of said sleeve; said sleeve having a cam surface thereon inclined to its direction of motion; a lug extending from said tool-block and engaging said cam surface; means for imparting a longitudinal motion to said sleeve; and a thrust bearing adapted to engage said pilot-bar to stop its longitudinal motion.

2. A cutting tool having a surface inclined to its axis; a chaser fitting and adapted to slide on said surface; an actuating rod adapted to slide in a bore longitudinal of said tool and having an arm extending laterally from said rod to engage said chaser; and a cam lever adapted to move said rod to actuate said chaser, and to fix said rod in its adjusted position.

3. A cutting tool comprising a pilot-bar and a sleeve adapted to move with reference to each other; a yielding means acting against said relative motion; cutters upon said tool; a tool-block carried by said tool and adapted to be actuated laterally of the same by stoppage of the pilot-bar and the relative motion between said bar and sleeve; said tool being adapted for relative rotation and longitudinal motion with respect to its work when driven by a source of power, which causes a relative movement between said bar and sleeve to actuate said tool-block and retract the cutters after said cutters have done their work.

4. A cutting tool comprising a pilot-bar and a sleeve adapted to move longitudinally with reference to each other; cutters upon said tool, a tool-block carried by said tool and adapted to be actuated laterally of the same by the relative motion between said bar and sleeve; said tool being adapted for relative rotation and longitudinal motion with respect to its work when driven by a source of power; and means for stopping said longitudinal motion of the pilot-bar after said cutters have done the work, whereby a relative motion between the bar and the sleeve is produced, said bar and sleeve being adapted to actuate said block laterally by the relative motion of the same.

5. In a cutting tool, the combination of a pilot-bar and a sleeve longitudinally movable relative to each other; a spring interposed between said bar and sleeve acting to resist said relative motion; a tool-block carried by the sleeve and movable laterally of said tool; a cam on the pilot-bar; a lug carried by said block and engaging said cam; said tool being adapted to be fed longitudinally; and means for interrupting the motion of the pilot-bar so that the further longitudinal motion shall cause a relative motion of said parts and contract said spring.

EMIL GAIRING.